US010356273B2

(12) United States Patent
Saratani

(10) Patent No.: US 10,356,273 B2
(45) Date of Patent: Jul. 16, 2019

(54) IMAGE READING DEVICE AND IMAGE READING METHOD

(71) Applicant: KYOCERA Document Solutions Inc., Osaka (JP)

(72) Inventor: Ken Saratani, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/030,907

(22) Filed: Jul. 10, 2018

(65) Prior Publication Data

US 2019/0020781 A1 Jan. 17, 2019

(30) Foreign Application Priority Data

Jul. 12, 2017 (JP) .................. 2017-135902

(51) Int. Cl.
*H04N 1/23* (2006.01)
*H04N 1/00* (2006.01)
*H04N 1/21* (2006.01)

(52) U.S. Cl.
CPC ....... *H04N 1/2315* (2013.01); *H04N 1/00225* (2013.01); *H04N 1/00233* (2013.01); *H04N 1/2104* (2013.01)

(58) Field of Classification Search
None
See application file for complete search history.

(56) References Cited

U.S. PATENT DOCUMENTS

| 5,737,601 | A  | * | 4/1998 | Jain ........................ G06F 16/27 707/622 |
| 6,256,675 | B1 | * | 7/2001 | Rabinovich ............. H04L 29/06 709/225 |
| 8,719,225 | B1 | * | 5/2014 | Rath ....................... G06F 16/27 707/634 |
| 8,769,055 | B2 | * | 7/2014 | Murphy .............. G06F 11/1451 707/634 |
| 8,868,508 | B2 | * | 10/2014 | Drobychev ............. G06F 16/23 707/652 |
| 8,930,311 | B1 | * | 1/2015 | Wang .................... G06F 3/0619 707/628 |

(Continued)

FOREIGN PATENT DOCUMENTS

JP 2009-044296 A 2/2009

*Primary Examiner* — Anh-Vinh T Nguyen
(74) *Attorney, Agent, or Firm* — Studebaker & Brackett PC

(57) ABSTRACT

The image reading device includes a scanner, a controller, and storage. The controller replicates first original image data specified by a replication instruction among the original image data stored in the storage to generate second original image data and stores information indicating a replication destination of the first original image data in the storage. Upon acquiring third original image data that is original image data from an image of an original document that is newly read by the scanner, the controller determines whether or not original document data volume indicating volume of the third original image data is greater than available capacity of the storage. Upon determining that the original document data volume is greater than the available capacity, the controller deletes one or more parts of the first original image data for which the replication destination information fulfills a predetermined condition from the storage.

8 Claims, 13 Drawing Sheets

(56) References Cited

U.S. PATENT DOCUMENTS

| | | | |
|---|---|---|---|
| 9,565,252 B2* | 2/2017 | Kazi | H04L 67/1097 |
| 9,600,193 B2* | 3/2017 | Ahrens | G06F 3/0619 |
| 2004/0267752 A1* | 12/2004 | Wong | H04L 29/06 |
| 2007/0185938 A1* | 8/2007 | Prahlad | G06F 16/2365 |
| 2008/0168303 A1* | 7/2008 | Spear | G06F 11/2058 714/6.12 |
| 2009/0030986 A1* | 1/2009 | Bates | G06F 3/0607 709/205 |
| 2010/0037031 A1* | 2/2010 | DeSantis | G06F 11/1461 711/162 |
| 2010/0199042 A1* | 8/2010 | Bates | G06F 11/2064 711/114 |
| 2012/0233118 A1* | 9/2012 | Holt | H04L 67/06 707/620 |
| 2013/0061013 A1* | 3/2013 | Tokoro | G06F 11/1076 711/162 |
| 2013/0097377 A1* | 4/2013 | Satoyama | G06F 3/0605 711/114 |
| 2013/0339818 A1* | 12/2013 | Baker | G06F 11/10 714/763 |
| 2015/0089171 A1* | 3/2015 | Fujita | G06F 11/1451 711/162 |
| 2016/0055225 A1* | 2/2016 | Xu | G06F 16/27 707/624 |
| 2016/0077926 A1* | 3/2016 | Mutalik | G06F 16/1844 |
| 2016/0150012 A1* | 5/2016 | Barszczak | G06F 16/27 709/219 |
| 2016/0196320 A1* | 7/2016 | Borowiec | G06F 3/0608 707/624 |
| 2017/0262346 A1* | 9/2017 | Pradhan | G06F 11/1464 |
| 2017/0315728 A1* | 11/2017 | Zheng | G06F 3/0604 |
| 2018/0181315 A1* | 6/2018 | Kusters | G06F 3/0608 |
| 2019/0073409 A1* | 3/2019 | Rahut | G06F 16/285 |
| 2019/0108341 A1* | 4/2019 | Bedhapudi | G06F 21/566 |

* cited by examiner

|  | 621 | 622 | 623 | 624 |
|---|---|---|---|---|
|  | Copy file name | Copy source | Copy destination | Copy date and time |
| CR1 | Image B | Box B | Box C | 2017/3/14/ 11:00 |
| CR2 | Image A | Box A | Box C | 2017/3/13/ 15:00 |
| CR3 | Image C | Box C | Box B | 2017/3/12/ 09:00 |
| | ⋮ | ⋮ | ⋮ | ⋮ |

| User name | Owner group |
|---|---|
| User A | D group |
| User B | E group |
| User C | D group |
| ⋮ | ⋮ |

| Deleted file name | Deletion reason | Deletion date and time |
|---|---|---|
| Image A | 2017/03/13 15:00 Copied from box A to box C | 2017/04/01 12:00 |
| ⋮ | ⋮ | ⋮ |

FIG. 10

| Sent file name | Sending source | Sending destination | Sending date and time |
|---|---|---|---|
| Document A | Box A | CCC@XXX.com | 2017/3/15/ 13:00 |
| Document B | Box B | AAA@XXX.com | 2017/3/14/ 15:00 |
| Document C | Box C | BBB@XXX.com | 2017/3/13/ 16:00 |
| ⋮ | ⋮ | ⋮ | ⋮ |

FIG. 12

IMAGE READING DEVICE AND IMAGE READING METHOD

INCORPORATION BY REFERENCE

The present application claims priority under 35 U.S.C. § 119 to Japanese Patent Application No. 2017-135902, filed on Jul. 12, 2017. The contents of this application are incorporated herein by reference in their entirety.

BACKGROUND

The present disclosure relates to an image reading device and an image reading method.

In general, a data-saving function of an electronic device is limited as available capacity in storage thereof decreases. To solve this problem, a digital camera prevents the function from being limited by the available capacity in the storage. In detail, the digital camera assigns a preferential order to image data and stores the image data in the storage. The digital camera erases the image data of the lowest preference stored in the storage when the available capacity in the storage is exceeded by volume of image data to be saved in the storage.

SUMMARY

An image reading device according the present disclosure includes an operation section, a scanner, a controller, and storage. The operation section receives an instruction of a user. The scanner reads an image of an original document. The controller acquires original image data indicating the image of the original document read by the scanner. The storage stores the original image data. The controller replicates first original image data to generate second original image data and stores replication destination information in the storage. The first original data indicates, among the original image data stored in the storage, the original image data of a replication source according to a replication instruction received by the operation panel. The replication destination information indicates a replication destination of the first original image data. Upon acquiring third original image data, the controller executes a capacity determination process to determine whether or not original document data volume indicating volume of the third original image data is greater than available capacity of the storage. The third original image data is the original image data from the image of the original document that is newly read by the scanner. Upon determining that the original document data volume is greater than the available capacity, the controller executes a deletion process to delete one or more parts of the first original image data for which the replication destination information fulfills a predetermined condition from the storage.

An image reading method according to the present disclosure includes the following: acquiring original image data indicating an image of an original document read by a scanner; storing the original image data in storage; and replicating first original image data to generate second original image data and storing replication destination information in the storage. The first original data indicates the original image data stored in the storage according to a replication instruction of a user. The replication destination information indicates a replication destination of the first original image data. The storing includes the following: determining whether or not original document data volume indicating volume of third original image data is greater than available capacity of the storage upon acquiring the third original image data, and deleting one or more parts of the first original image data for which the replication destination information fulfills a predetermined condition from the storage upon determining that the original document data volume is greater than the available capacity. The third original image data is the original image data from the image of the original document that is newly read by the scanner.

BRIEF DESCRIPTION OF THE DRAWINGS

FIG. 6 is a diagram illustrating an example of a copy record according to the first embodiment of the present disclosure.

FIG. 9 is a diagram illustrating an example of a user management table according to the first embodiment of the present disclosure.

FIG. 10 is a diagram illustrating an example of a deletion record according to the first embodiment of the present disclosure.

FIG. 12 is a diagram illustrating an example of a sending record according to the second embodiment of the present disclosure.

DETAILED DESCRIPTION

An image reading device and an image reading method according to embodiments of the present disclosure will be described as follows with reference to the drawings. Note that elements within the drawings that are the same or equivalent will be referred to with the same reference numbers and description thereof will not be repeated.

First Embodiment

Figure 1:
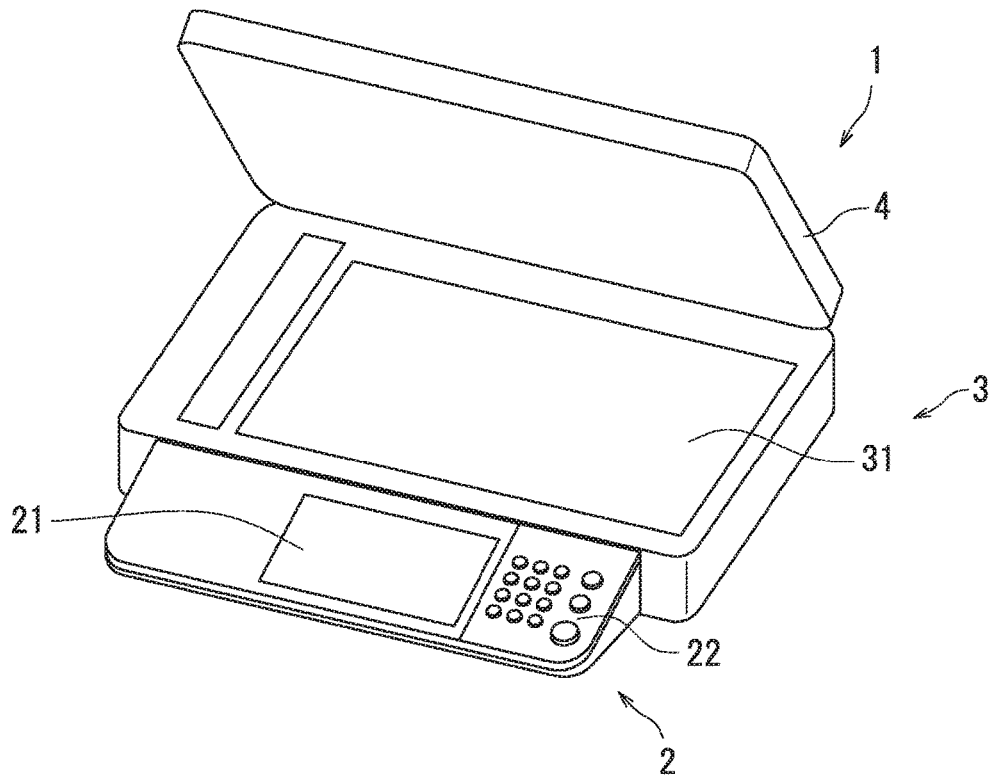
FIG. 1 is a diagram illustrating an image reading device according to a first embodiment of the present disclosure.

First, a configuration of an image reading device I according to a first embodiment of the present disclosure will be described with reference to FIG. 1. FIG. 1 is a diagram illustrating the image reading device 1 according to the first embodiment.

As illustrated in FIG 1, the image reading device 1 includes an operation section 2, a scanner 3, and a platen cover 4.

The operation section 2 receives an instruction of a user. The user can input the instruction to the image reading device 1 by operating the operation section 2. The operation section 2 includes a display 21 and a plurality of operation keys 22. The display 21 displays operation screens and various process results, for example. The operation keys 22 include a start key for a reading start instruction, for example.

The scanner 3 reads an image of an original document and outputs a signal indicating image data of the original document when the operation section 2 receives the reading start instruction. In the following, the image data of the original document will be referred to as "original image data". The scanner 3 includes contact glass 31. The original document is placed on the contact glass 31.

The platen cover 4 is openable and closable. When the platen cover 4 is open, the contact glass 31 is exposed. When the platen cover 4 is closed by contrast, the contact glass 31 is covered by the platen cover 4.

Figure 2:
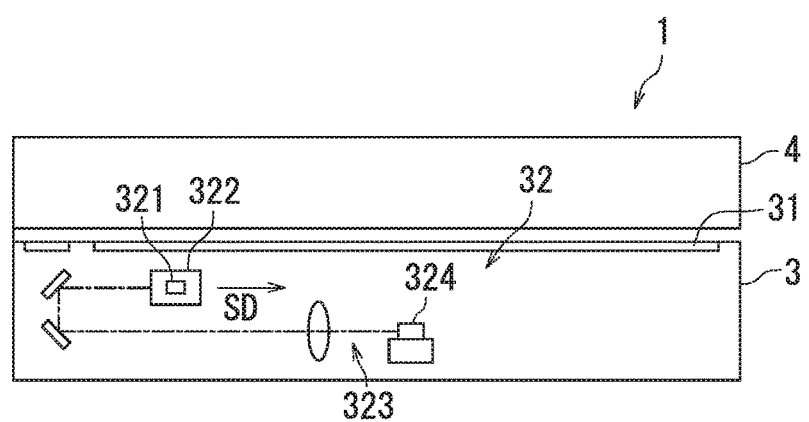
FIG. 2 is a diagram illustrating a configuration of a scanner according to the first embodiment of the present disclosure.

Next, a configuration of the scanner 3 according to the first embodiment will be described with reference to FIG. 2. FIG. 2 is a diagram illustrating the configuration of the scanner 3 according to the first embodiment.

As illustrated in FIG. 2, the scanner 3 includes a reading mechanism 32 in addition to the contact glass 31.

The contact glass 31 is located in an upper portion of the scanner 3. The reading mechanism 32 includes a light source 321, a carriage 322, an optical system 323, and a charge-coupled device (CCD) image sensor 324. The light source 321 is supported by the carriage 322. The carriage 322 moves in a sub-scanning direction SD. The light source 321 irradiates the original document placed on the contact glass 31 with light while moving in the sub-scanning direction SD. The optical system 323 guides the light reflected from the original document to the CCD image sensor 324. The CCD image sensor 324 converts the light guided by the optical system 323 to an electrical signal and outputs the electrical signal. In detail, the CCD image sensor 324 outputs a signal indicating the original image data.

Figure 3:
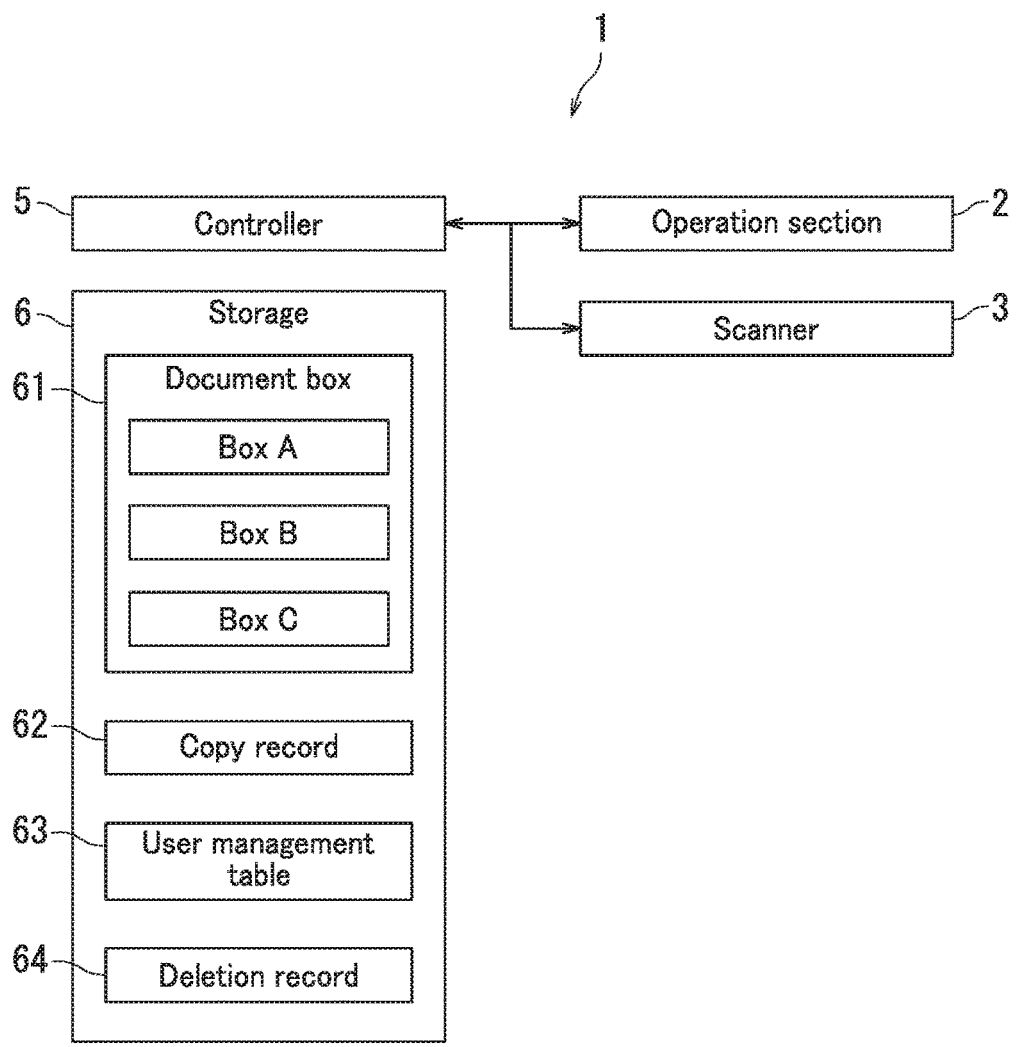
FIG. 3 is a diagram illustrating a configuration of the image reading device according to the first embodiment of the present disclosure.

Continuing, the configuration of the image reading device 1 according to the first embodiment will be described in detail with reference to FIG. 3. FIG. 3 is a diagram illustrating the configuration of the image reading device 1 according to the first embodiment.

As illustrated in FIG. 3, the image reading device 1 further includes a controller 5 and storage 6.

The controller 5 controls operation of each section of the image reading device 1. The controller 5 includes a processor such as a central processing unit (CPU), for example.

The controller 5 receives a signal indicating the instruction of the user from the operation section 2. The controller 5 directs the scanner 3 to read the image of the original document when the operation section 2 receives the reading start instruction. Upon reading the image of the original document, the scanner 3 sends the signal indicating the original image data to the controller 5. The controller 5 executes a data acquisition process and a data storage process upon receiving the signal indicating the original image data from the scanner 3. The data acquisition process means a process of acquiring the original image data from the signal indicating the original image data sent from the scanner 3. The data storage process means a process of storing the original image data in the storage 6.

The storage 6 stores various data. The various data includes the original image data acquired from the signal sent from the scanner 3. In the following, the original image data stored in the storage 6 will be referred to as "first original image data".

The storage 6 includes a storage device and semiconductor memory. The storage device includes either or both a hard disk drive (HDD) and a solid-state drive (SSD), for example. The semiconductor memory constitutes random-access memory (RAM) and read-only memory (ROM), for example.

The storage 6 stores a control program. The control program is executed by the controller 5. The controller 5 controls the operation of each section included in the image reading device 1 by executing the control program.

The storage 6 stores a document box 61, a copy record 62, a user management table 63, and a deletion record 64.

The original image data (first original image data) is placed in the document box 61.

The document box 61 includes a plurality of boxes. The user assigns a box in which the original image data is to be placed. Specifically, the user operates the operation section 2 to assign the box in which the original image data is to be placed when giving the reading start instruction.

Owners are set for each box. According to the present embodiment, a "user A" is set as an owner of a "box A", a "user B" is set as an owner of a "box B", and a "user C" is set as an owner of a "box C".

Figure 4:
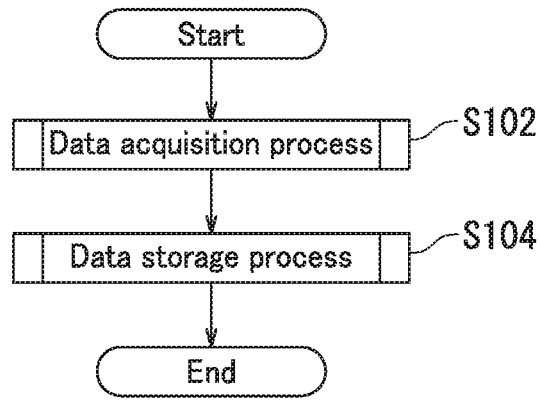
FIG. 4 is a flowchart illustrating a data saving process according to the first embodiment of the present disclosure.

Next, a data saving process according to the first embodiment will be described with reference to FIGS. 3 and 4. FIG. 4 is a flowchart illustrating the data saving process according to the first embodiment. The data saving process means a process of saving data in the storage 6. The data saving process is started when the controller 5 receives the signal indicating the original image data from the scanner 3.

As illustrated in FIG. 4, the controller 5 executes the data acquisition process upon receiving the signal indicating the original image data from the scanner 3 (Step S102), In detail, the controller 5 acquires the original image data based on the signal indicating the original image data sent from the scanner 3. Continuing, the controller 5 executes the data storage process (Step S104), In detail, the controller 5 stores the acquired original image data in the storage 6. Specifically, the controller 5 places the original image data into a box assigned by the user among the boxes in the storage 6 (refer to FIG. 3). Upon storing the acquired original image data in the storage 6, the controller 5 ends the data saving process.

Continuing, a data replication process executed by the controller 5 will be described with reference to FIG. 3. The user can replicate the original image data (first original image data) placed in a box to which the user is set as an owner (hereafter referred to as an "own box" or a "user box") by operating the operation section 2. When instructing replication, the user assigns original image data as a replication target and a replication destination of the replicated original image data (hereafter referred to as "second original image data") by operating the operation section 2. According to the present embodiment, the replication destination is a box to which a different user than the user instructing replication is set as an owner. In the following, the box to which the different user is set as the owner will be referred to as an "other user box".

The controller 5 executes the data replication process upon receiving a signal indicating a replication instruction from the operation section 2. In detail, the controller 5 replicates the first original image data to generate the second original image data. The second original image data is placed in the assigned box (other user box). Upon placing the second original image data in the other user box, the controller 5 registers replication destination information indicating the replication destination of the first original image data in the copy record 62 stored in the storage 6.

Figure 5:
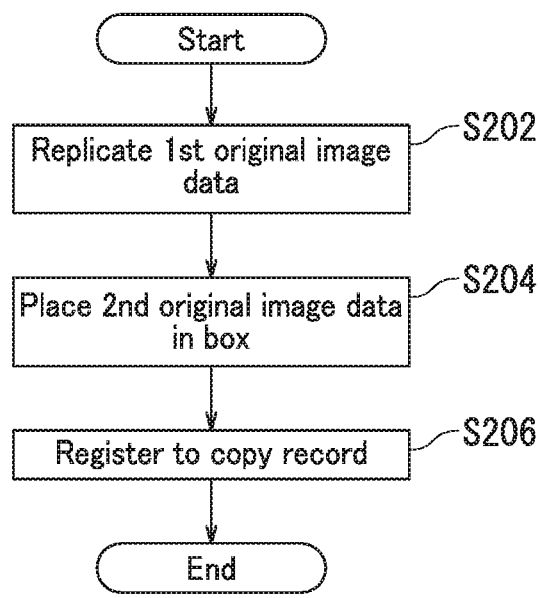
FIG. 5 is a flowchart illustrating a data replication process according to the first embodiment of the present disclosure.

Continuing, the data replication process according to the first embodiment will be further described with reference to FIGS. 3 and 5. FIG. 5 is a flowchart illustrating the data replication process according to the first embodiment. The data. replication process is started when the controller 5 receives the signal indicating the replication instruction from the operation section 2. Note that replicating according to an aspect of the present disclosure is carried out through the data replication process.

As illustrated in FIG. 5, the controller 5 replicates the first original image data to generate the second original image data according to the replication instruction (Step S202). Next, the controller 5 places the second original image data in the assigned box (Step S204). Next, the controller 5 registers the replication destination information indicating the box in which the second original image data is placed to the copy record 62 (Step S206), and the data replication process ends.

Next, the copy record 62 according to the first embodiment will be described with reference to FIG. 6. FIG. 6 is a diagram illustrating an example of the copy record 62 according to the first embodiment.

As illustrated in FIG. 6, the copy record 62 associates copy file names 621, copy sources 622, copy destinations 623, and copy dates and times 624.

In the example illustrated in FIG. 6, the copy record 62 includes a first copy record CR1, a second copy record CR2, and a third copy record CR3. The first copy record CR1 indicates that an "image B" (first original image data) placed in the box B was replicated at "2017/03/14 11:00". The first copy record CR1 further indicates that the replicated data (second original image data) of the image B (first original image data) has been placed in the box C. The second copy record CR2 indicates that an "image A" (first original image data) placed in the box A was replicated at "2017/03/13 15:00". The second copy record CR2 further indicates that the replicated data (second original image data) of the image A (first original image data) has been placed in the box C. The third copy record CR3 indicates that an "image C" (first original image data) placed in the box C was replicated at "2017/03/12 9:00". The third copy record CR3 further indicates that the replicated data (second original image data) of the image C (first original image data) has been placed in the box B.

Continuing, the data storage process described with reference to FIG. 4 (Step S104) will be further described with reference to FIGS. 3 and 7.

The controller 5 executes the data storage process as described with reference to FIG. 4 (Step S104) upon acquiring original image data from an image of an original document that is newly read by the scanner 3. In the following, the original image data that is newly acquired by the controller 5 will be referred to as "third original image data". The controller 5 executes a capacity determination process during the data storage process. In detail, the controller 5 determines whether or not original document data volume indicating volume of the third original image data is greater than available capacity of the storage 6. The controller 5 executes the capacity determination process each time original image data (third original image data) is acquired.

Figure 7:
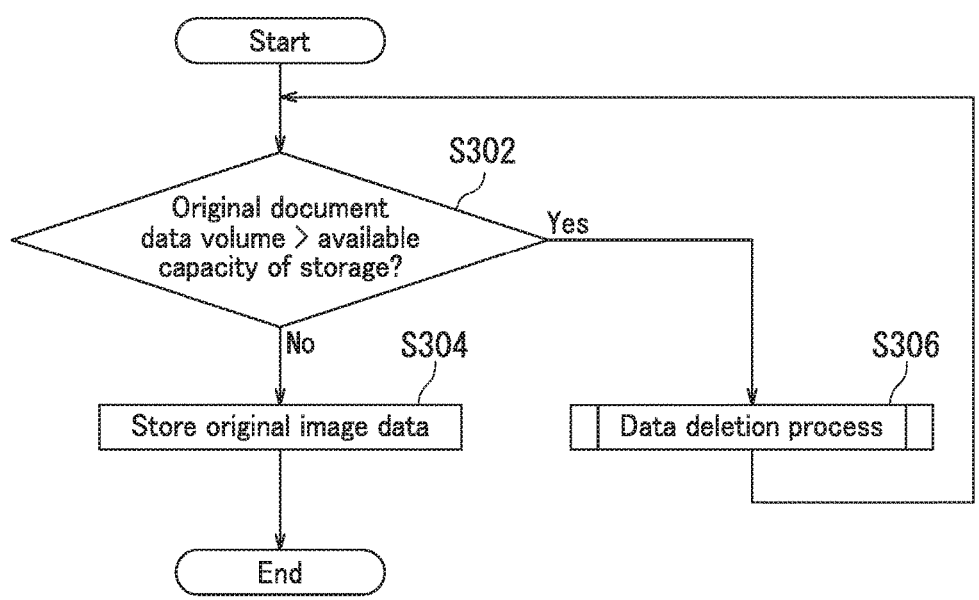
FIG. 7 is a flowchart illustrating a data storage process according to the first embodiment of the present disclosure.

FIG. 7 is a flowchart illustrating the data storage process according to the first embodiment. The data storage process is started when the controller 5 acquires the original image data (third original image data).

As illustrated in FIG. 7, the controller 5 determines whether or not the original document data volume is greater than the available capacity of the storage 6 upon acquiring the third original image data (Step S302). Upon determining that the original document data volume is not greater than the available capacity of the storage 6 (Step S302: No), the controller 5 stores the third original image data in the storage 6 (Step S304) and ends the data storage process. Upon determining that the original document data volume is greater than the available capacity of the storage 6 by contrast (Step S302: Yes), the controller 5 executes a data deletion process (Step S306). In detail, the controller 5 deletes one or more parts of the first original image data for which the replication destination information fulfills a predetermined condition from the storage 6.

Continuing, the data deletion process according to the first embodiment will be described with reference to FIGS. 3 and 6 to 10.

Figure 8:
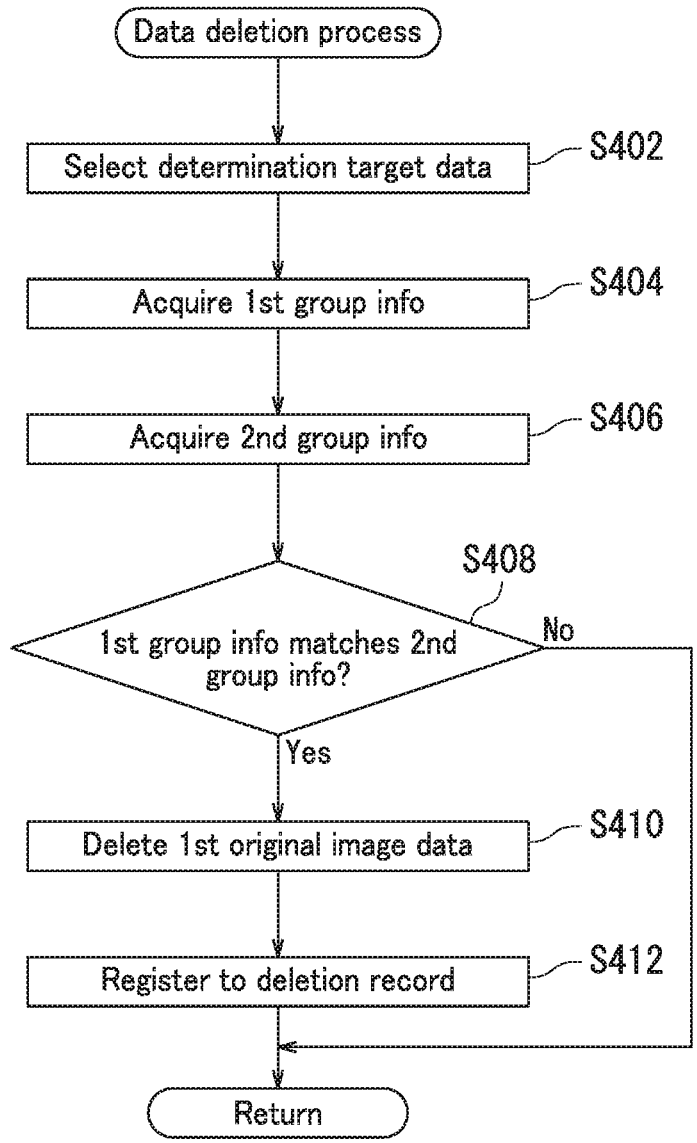
FIG. 8 is a flowchart illustrating a data deletion process according to the first embodiment of the present disclosure.

FIG. 8 is a flowchart illustrating the data deletion process according to the first embodiment.

As illustrated in FIG. 8, the controller 5 refers to the copy record 62 to select determination target data (first original image data) (Step S402). The determination target data indicates the first original image data selected as a target that is determined whether or not to be deleted from the storage 6. In detail, the controller 5 selects first original image data with the oldest copy date and time 624 as determination target data from the first original image data that has not yet been selected as the determination target data since acquisition of the third original image data. Next, the controller 5 acquires first group information of the first original image data selected as the determination target data (Step S404). The first group information indicates a group to which an owner of the box in which the first original image data is placed belongs. Specifically, the controller 5 specifies a box as a copy source 622 of the first original image data selected as the determination target data and specifies the user of the box specified as the copy source 622. For example, in the example illustrated in FIG. 6, the copy source 622 of the image A is the box A, and the owner of the box A is the user A as described with reference to FIG. 3.

Upon specifying the user of the box of the copy source 622, the controller 5 refers to the user management table 63 (refer to FIG. 3) to specify a group to which the specified user (user A, for example) belongs. The user management table 63 associates every user registered in the image reading device 1 with groups to which the users belong.

Next, the controller 5 acquires second group information (Step S406). The second group information indicates a group to which an owner of a box in which the second original image data (replicated data of the first original image data) has been placed belongs. Specifically, the controller 5 specifies a box as a copy destination 623 of the first original image data selected as the determination target data (box as a placement destination of the second original image data) and specifies the user of the box specified as the copy destination 623. For example, in the example illustrated in FIG. 6, the copy destination 623 of the image A is the box C, and the owner of the box C is the user C as described with reference to FIG. 3.

Upon specifying the user of the box of the copy destination 623, the controller 5 refers to the user management table 63 to acquire a group to which the specified user (user C, for example) belongs.

Next, the controller 5 determines whether or not the first group information matches the second group information (Step S408). Upon determining that the first group information does not match the second group information (Step S408: No), the controller 5 returns to the process of Step S302 illustrated in FIG. 7. Upon determining that the first group information matches the second group information by contrast (Step S408: Yes), the controller 5 deletes the first original image data selected as the determination target data from the storage 6 (Step S410). Next, the controller 5 registers information related to the deleted first original image data to the deletion record 64 (refer to FIG. 3) (Step S412), and returns to the process of Step S302 illustrated in FIG. 7.

Upon returning to Step S302 illustrated in FIG. 7, the controller 5 redetermines whether or not the original document data volume is greater than the available capacity. The controller 5 repeatedly executes the capacity determination process (Step S302) and the data deletion process (Step S306) until determining that the original document data volume is not greater than the available capacity (Step S302: No).

Note that in Step S402 illustrated in FIG. 8, the controller 5 refers to the copy record 62 to select the first original image data (determination target data) in chronological order of copy date and time 624. In the example illustrated in FIG. 6, the controller 5 selects the first original image data corresponding to the image C, the image A, and the image B as the determination target data in the stated order.

The order of the steps in the data deletion process is not limited to the order described in FIG. 8. For example, the order of Step S404 and Step S406 may be reversed. The order of Step S410 and Step S412 may also be reversed.

Next, the user management table 63 according to the first embodiment will be described with reference to FIGS. 3, 6, and 9. FIG. 9 is a diagram illustrating an example of the user management table 63 according to the first embodiment.

As illustrated in FIG. 9, the user management table 63 associates user names 631 with owner groups 632. The owner groups 632 mean groups to which the users belong. The owner groups 632 indicate divisions and departments of an organization such as a company, for example. In the example illustrated in FIG. 9, the owner group 632 of the user A is a "D group". The owner group 632 of the user B is an "E group". The owner group 632 of the user C is the D group.

Next, the deletion record 64 according to the first embodiment will be described with reference to FIG. 10. FIG. 10 is a diagram illustrating an example of the deletion record 64 according to the first embodiment. The deletion record 64 means a deletion record related to the first original image data deleted by the controller 5.

As illustrated in FIG. 10, the deletion record 64 associates deleted file names 641, deletion reasons 642, and deletion dates and times 643. The deleted file names 641 are an example of identification information indicating the deleted first original image data.

In the example illustrated in FIG. 10, the deletion record 64 includes a record indicating that the image A was deleted at "2017/04/01 12:00" because the image A was "copied from the box A to the box C" at "2017/03/13 15:00".

The deletion record 64 is displayed on the display 21 described with reference to FIG. 1. The user can display the deletion record 64 on the display 21 by operating the operation section 2.

The first embodiment has been described above. According to the first embodiment, the controller 5 refers to the copy record 62 and deletes one or more parts of the first original image data for which the replication destination information fulfills a predetermined condition from the storage 6. Accordingly, the user need not preset a preference to the first original image data. As a result, convenience for the user can be inhibited from decreasing.

Also according to the present embodiment, the controller 5 deletes one or more parts of the first original image data from which replicated data (second original image data) has been generated. In other words, the controller 5 deletes original image data for which original image data identical thereto in content is stored in the storage 6. Accordingly, the identical original image data can be inhibited from being redundantly stored in the storage 6 and thus exhausting storage capacity thereof.

According to the present embodiment, the controller 5 registers the deletion reason 642 to the deletion record 64 when deleting first original image data. The deletion reason 642 indicates the copy destination 623. Accordingly, the user can easily know which box the original image data (second original image data) identical in content to the deleted first original image data has been placed in by referring to the deletion reason 642.

According to the present embodiment, data replicated by a user belonging to a group is placed in the box of a different user belonging to the same group. Accordingly, the user can acquire the original image data (second original image data) identical in content to the deleted first original image data by asking the different user belonging to the same group in case the deleted first original image data becomes needed.

Note that according to the present embodiment, the controller 5 repeatedly executes the capacity determination process and the data deletion process until determining that the original document data volume is not greater than the available capacity. However, the controller 5 may delete one or more parts of the first original image data according to a predetermined condition when there is no candidate determination target data or candidate determination target data has run out. For example, the controller 5 may delete one or more parts of the first original image data in chronological order of save date and time, and determine whether or not the original document data volume is greater than the available capacity of the storage 6.

Second Embodiment

Continuing, a second embodiment of the present disclosure will be described with reference to FIGS. 7, 9, and 11 to 15. The second embodiment differs from the first embodiment in that a controller 5 according to the second embodiment refers to an e-mail sending record instead of the copy record 62. Items of the second embodiment that differ from the first embodiment will be described as follows. Description of elements that the second embodiment shares with the first embodiment will be omitted.

Figure 11:
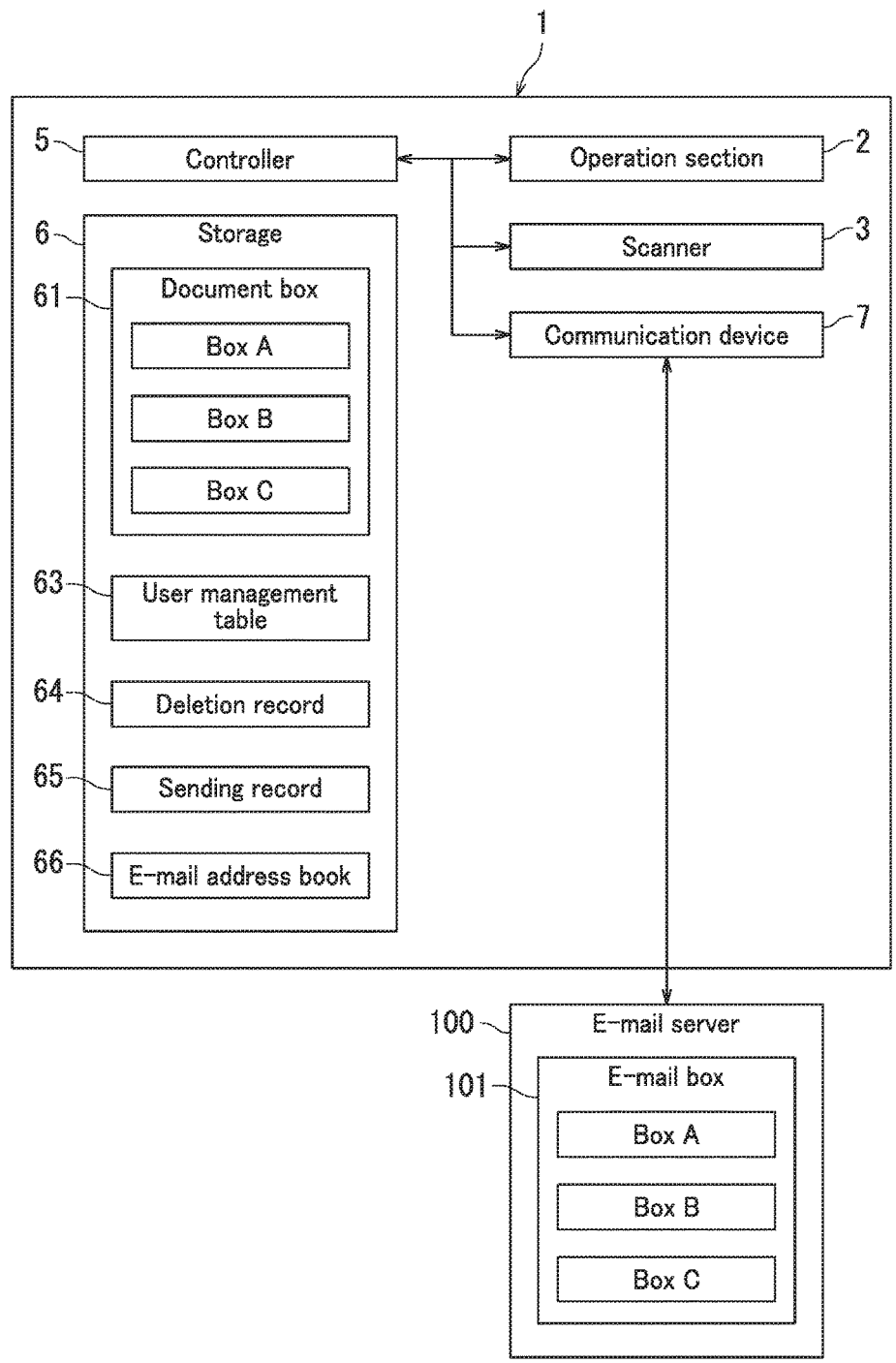
FIG. 11 is a diagram illustrating a configuration of an image reading device according to a second embodiment of the present disclosure.

FIG. 11 is a diagram illustrating a configuration of an image reading device 1 according to the second embodiment. As illustrated in FIG. 11, the image reading device 1 according to the second embodiment further includes a communication device 7.

The communication device 7 connects to an e-mail server 100 (external device) through a network such as a local area network (LAN).

The e-mail server 100 includes a storage area. An e-mail box 101 is stored in the storage area. According to the present embodiment, the e-mail box 101 includes a plurality of boxes (a box A, a box B, and a box C). Owners are set for each box. According to the present embodiment, a "user A" is set as an owner of the box A, a "user B" is set as an owner of the box B, and a "user C" is set as an owner of the box C. Corresponding e-mail addresses 661 are set for each box. According to the present embodiment, a user inputs an instruction to send replicated data (second original image data) of original image data (first original image data) placed in an own box to the e-mail server 100 by operating an operation section 2. In the following, the instruction to send the second original image data to the e-mail server 100 will be referred to as a "sending instruction". Note that the sending instruction is equivalent to a replication instruction according to an aspect of the present disclosure.

The controller 5 executes an e-mail sending process upon receiving a signal indicating the sending instruction from the operation section 2. In detail, the controller 5 sends the second original image data (replicated data of the first original image data) to the e-mail server 100 through the communication device 7. When inputting the sending instruction, the user assigns original image data (first original image data) as a sending target and a replication destination of the original image data (second original image data) obtained by replicating the original image data, assigned as the sending target by operating the operation section 2. According to the present embodiment, the replication destination indicates any one of the boxes included in the e-mail box 101 provided in the e-mail server 100. Specifically, the replication destination indicates the e-mail address 661 corresponding to any one of the boxes included in the e-mail box 101.

Storage 6 stores a document box 61, a user management table 63, a deletion record 64, a sending record 65, and an e-mail address book 66.

Next, the sending record 65 according to the second embodiment will be described with reference to FIGS. 11 and 12. FIG. 12 is a diagram illustrating an example of the sending record 65 according to the second embodiment.

As illustrated in FIG. 12, the sending record 65 indicates a record of original image data sent to the e-mail server 100 from among the original image data placed in the document box 61. In detail, the sending record 65 associates sent file names 651, sending sources 652, sending destinations 653, and sending dates and times 654. According to the present embodiment, the sending sources 652 each indicate any one of a plurality of boxes included in the document box 61. The sending destinations 653 each indicate the e-mail address 661 corresponding to any one of the box A, the box B, and the box C provided in the e-mail box 101. The sending dates and times 654 each indicate a date and time that an e-mail was sent to a sending destination 653.

In the example illustrated in FIG. 12, the sending record 65 includes a first sending record SR1, a second sending record SR2, and a third sending record SR3. The first sending record SR1 indicates that a "document A" was sent from the box A to "CCC@XXX.com." at "2017/03/15 13:00". The second sending record SR2 indicates that a "document B" was sent from the box B to "AAA@XXX.com" at "2017/03/14 15:00". The third sending record SR3 indicates that a "document C" was sent from the box C to "BBB@XXX.com" at "2017/03/13 16:00".

Figure 13:
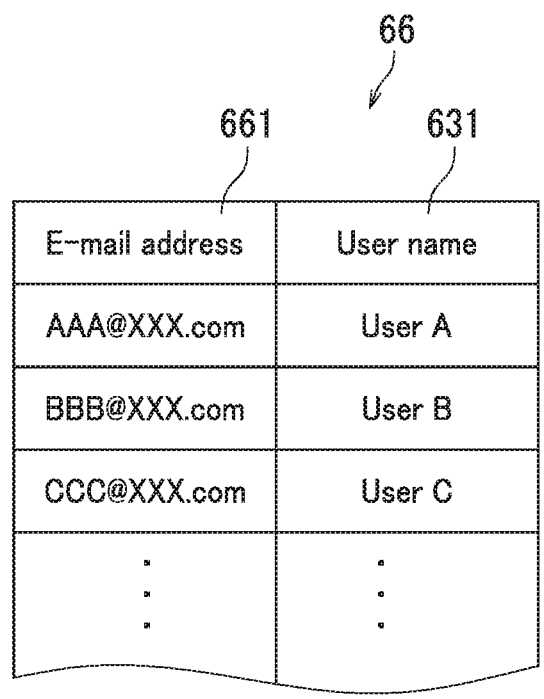
FIG. 13 is a diagram illustrating an example of an e-mail address book according to the second embodiment of the present disclosure.

Next, the e-mail address book 66 according to the second embodiment will be described with reference to FIG. 13. FIG. 13 is a diagram illustrating an example of the e-mail address book 66 according to the second embodiment.

As illustrated in FIG. 13, the e-mail address book 66 associates each user name 631 with an e-mail address 661. In the example illustrated in FIG. 13, AAA@XXX.com is associated as an e-mail address 661 of the user A, BBB@XXX.com is associated as an e-mail address 661 of the user B, and CCC@XXX.com is associated as an e-mail address 661 of the user C. Note that the e-mail address AAA@XXX.com corresponds to the box A from the e-mail box 101 described with reference to FIG 11. The e-mail address BBB@XXX.com corresponds to the box B from the e-mail box 101 described with reference to FIG. 11. The e-mail address CCC@XXX.com corresponds to the box C from the e-mail box 101 described with reference to FIG. 11. Note that the e-mail address book 66 may be referred to when the user assigns the replication destination by operating the operation section 2.

Figure 14:
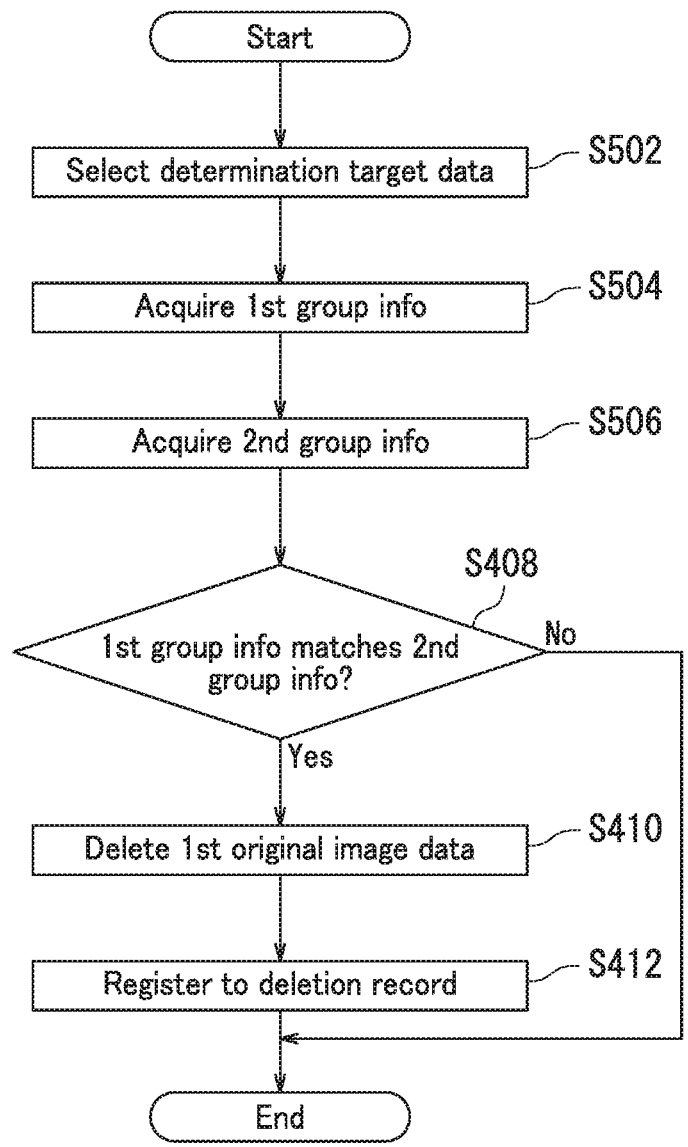
FIG. 14 is a flowchart illustrating a data deletion process according to the second embodiment of the present disclosure.

Continuing, a data deletion process according to the second embodiment will be described with reference to FIGS. 7, 9, and 11 to 14. FIG. 14 is a flowchart illustrating the data deletion process according to the second embodiment.

As illustrated in FIG. 14, the controller 5 refers to the sending record 65 to select determination target data (first original image data) (Step S502). In detail, the controller 5 selects first original image data with the oldest sending date and time 654 as determination target data from the first original image data that has not yet been selected as the determination target data since acquisition of third original image data. Next, the controller 5 acquires first group information of the first original image data selected as the determination target data (Step S504), The controller 5 refers to the user management table 63 (refer to FIG. 9) to acquire the first group information in the same manner as in the first embodiment (refer to Step S404 in FIG. 8).

Next, the controller 5 acquires second group information (Step S506). The second group information indicates a group to which an owner of a box corresponding to the e-mail address 661 (user associated with the e-mail address 661) assigned as the sending destination 653 of the second original image data (replicated data of the first original image data) belongs. Specifically, the controller 5 specifies an e-mail address 661 as the sending destination 653 of the first original image data selected as the determination target data and specifies the user associated with the e-mail address 661 specified as the sending destination 653. In the example illustrated in FIG. 12, for example, the sending destination 653 of the document A is CCC@XXX.com. As described with reference to FIG. 13, the user associated with the sending destination CCC@XXX.com is the user C. As illustrated in FIG. 9, the group to which the user C belongs is a "D group". Accordingly, when the document A illustrated in FIG. 12 is selected as the determination target data, the controller 5 acquires the D group as the second group information corresponding to the first original image data.

Next, the controller 5 determines whether or not the first group information matches the second group information (Step S408). Upon determining that the first group information does not match the second group information (Step S408: No), the controller 5 returns to the process of Step S302 illustrated in FIG. 7. Upon determining that the first group information matches the second group information by contrast (Step S408: Yes), the controller 5 deletes the first original image data selected as the determination target data (Step S410). Next, the controller 5 registers information related to the deleted first original image data to the deletion record 64 (Step S412), and returns to the process of Step S302 illustrated in FIG. 7.

Upon returning to Step S302 illustrated in FIG. 7, the controller 5 redetermines whether or not the original image data is greater than available capacity. The controller 5 repeatedly executes a capacity determination process (Step S302) and the data deletion process (Step S306) until determining that original document data volume is not greater than the available capacity (Step S302: No).

Note that in Step S502 illustrated in FIG. 14, the controller 5 refers to the sending record 65 to select the first original image data (determination target data) in chronological order of sending date and time 654. In the example illustrated in FIG. 12, the controller 5 selects the first original image data corresponding to the document C, the document B, and the document A as the determination target data in the stated order.

The order of the steps in the data deletion process is not limited to the order described in FIG. 14. For example, the order of Step S504 and Step S506 may be reversed.

Figure 15:
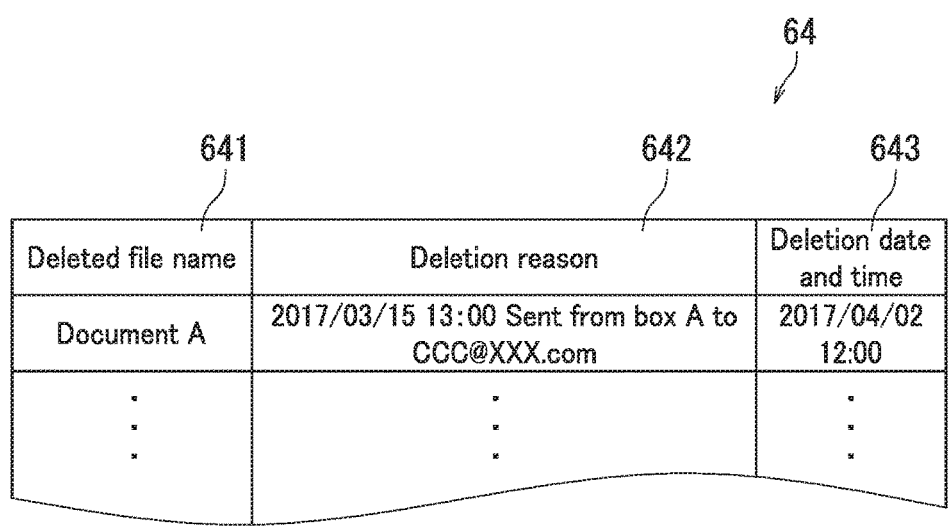
FIG. 15 is a diagram illustrating an example of a deletion record according to the second embodiment of the present disclosure.

FIG. 15 is a diagram illustrating an example of the deletion record 64 according to the second embodiment. In the example illustrated in FIG. 15, the deletion record 64 includes a record indicating that the document A was deleted at "2017/04/0 12:00" because the document A was "sent to CCC@XXX.com from the box A" at "2017/03/15 13:00".

The second embodiment has been described above. According to the present embodiment, the controller 5 refers to the sending record 65 and deletes a part of the first original image data for which replication destination information fulfills a predetermined condition from the storage 6. Accordingly, the user need not preset preference to the first original image data. As a result, convenience for the user can be inhibited from decreasing.

According to the present embodiment, the controller 5 deletes a part of the first original image data from which replicated data (second original image data) has been generated. The replicated data is sent to the e-mail box of a different user belonging to the same group. Accordingly, the user can acquire the original image data (second original image data) identical in content to the deleted first original image data by asking the different user belonging to the same group in case the deleted first original image data has become needed.

The embodiments of the present disclosure have been described above with reference to the drawings (FIGS. 1 to 15). However, the present disclosure is not limited to the above-mentioned embodiments, and may be performed in various manners within a scope not departing from the gist thereof. Also, the configuration illustrated in the above-mentioned embodiments is but one example and is not particularly limited. The configuration may be variously altered within a scope not substantially departing from the effects of the present disclosure.

For example, according to the embodiments of the present disclosure, an example of the controller 5 is described as deleting first original image data for which the replication destination information fulfills a predetermined condition one part at a time. However, the present disclosure is not limited hereto. According to the present disclosure, the controller 5 need only be able to save newly acquired data in the storage 6. For example, the controller 5 may delete all of the first original image data for which the replication destination information fulfills the predetermined condition at one time.

Items described in the first embodiment and the second embodiment may also be appropriately combined.

What is claimed is:

1. An image reading device, comprising:
   an operation section configured to receive an instruction of a user;
   a scanner configured to read an image of an original document;
   a controller configured to acquire original image data indicating the image of the original document read by the scanner; and
   storage configured to store the original image data, wherein
   the controller replicates first original image data to generate second original image data and stores replication destination information in the storage,
   the first original data indicates, among the original image data stored in the storage, the original image data of a replication source according to a replication instruction received by the operation panel,
   the replication destination information indicates a replication destination of the first original image data,
   upon acquiring third original image data that is the original image data from the image of the original document that is newly read by the scanner, the controller executes a capacity determination process to determine whether or not original document data volume indicating volume of the third original image data is greater than available capacity of the storage, and
   upon determining that the original document data volume is greater than the available capacity, the controller executes a deletion process to delete one or more parts of the first original image data for which the replication destination information fulfills a predetermined condition from the storage.

2. The image reading device according to claim 1, wherein
   the storage includes boxes in which the first original image data and the second original image data are placed,
   the replication destination information indicates a box in which the second original image data is placed,
   the controller acquires first group information and second group information in the deletion process, the first group information indicating a group to which an owner of the box in which the first original image data is placed belongs, the second group information indicating a group to which an owner of the box in which the second original image data is placed belongs, and
   the controller deletes one or more parts of the first original image data for which the first group information matches the second group information from the storage.

3. The image reading device according to claim 2, wherein
   the storage stores replication date and time data in association with the first original image data, the date and time data indicating a date and time of replication of the first original image data, and
   the controller preferentially deletes one or more parts of the first original age data in chronological order of the date and time of replication.

4. The image reading device according to claim 1, further comprising:
   a communication device configured to exchange data with an e-mail server, wherein the controller sends the second original image data to the e-mail server through the communication device, the replication destination information indicates an e-mail box provided in the e-mail server, the controller acquires first group information and second group information in the deletion process, the first group information indicating a group to which an owner of the first original image data belongs, the second group information indicating a group to which an owner of the e-mail box belongs, and the controller deletes one or more parts of the first original image data for which the first group information matches the second group information from the storage.

5. The image reading apparatus according to claim 4, wherein the storage stores sending date and time data in association with the first original image data, the sending date and time data indicating a date and time of sending of the second original image data to the e-mail server, and the controller preferentially deletes one or more parts of the first original image data in chronological order of the date and time of sending.

6. The image reading device according to claim 1, wherein the controller associates identification information indicating the deleted first original image data with the replication destination information of the deleted first original image data and stores the identification information in the storage.

7. The image reading device according to claim 1, wherein upon determining that the original document data volume is greater than the available capacity, the controller repeatedly executes the capacity determination process and the deletion process until determining that the original document data volume is not greater than the available capacity.

8. An image reading method, comprising:

acquiring original image data indicating an image of an original document read by a scanner;

storing the original image data in storage; and replicating first original image data to generate second original image data and storing replication destination information in the storage, the first original image data indicating the original image data stored in the storage according to a replication instruction of a user, the replication destination information indicating a replication destination of the first original image data, wherein the storing includes upon acquiring third original image data that is the original image data from the image of the original document that is newly read by the scanner, determining whether or not original document data volume indicating volume of the third original image data is greater than available capacity of the storage, and upon determining that the original document data volume is greater than the available capacity, deleting one or more parts of the first original image data for which the replication destination information fulfills a predetermined condition from the storage.

* * * * *